United States Patent [19]
Moran, Jr.

[11] Patent Number: 5,377,396
[45] Date of Patent: Jan. 3, 1995

[54] METHOD OF MAKING A CONTINUOUS PLASTIC HINGE STRUCTURE

[75] Inventor: Thomas F. Moran, Jr., Chagrin Falls, Ohio

[73] Assignee: Qube Corporation, Chagrin Falls, Ohio

[21] Appl. No.: 26,603

[22] Filed: Mar. 5, 1993

[51] Int. Cl.⁶ .................... B21D 53/40; B21K 13/02
[52] U.S. Cl. ............................. 29/11; 29/434; 29/DIG. 26; 16/DIG. 13; 16/DIG. 42
[58] Field of Search ............ 29/3, 11, 434, 450, 29/451, 437, DIG. 26; 16/262, 267, 385, 387, DIG. 13, DIG. 42

[56] References Cited

U.S. PATENT DOCUMENTS

| | | | |
|---|---|---|---|
| 1,484,343 | 2/1924 | Soss | 29/11 |
| 1,544,329 | 6/1925 | McKinney, Jr. | 29/11 |
| 1,723,628 | 8/1929 | Barsons | 16/DIG. 42 X |
| 1,801,559 | 4/1931 | Kellogg | 29/11 |
| 2,288,013 | 6/1942 | Moynahan et al. | 29/11 |
| 3,803,668 | 4/1974 | Remick | 16/267 X |
| 4,010,524 | 3/1977 | Osamu et al. | 29/11 |
| 4,114,238 | 9/1978 | Powell | 29/11 X |
| 4,358,871 | 11/1982 | Takai | 16/262 |
| 4,603,452 | 8/1986 | Paciorek | 16/262 |
| 4,615,464 | 10/1986 | Byrns | 29/11 X |
| 4,930,753 | 6/1990 | Alvyn | 16/DIG. 13 X |
| 5,070,577 | 12/1991 | Bonneville et al. | 16/267 X |

FOREIGN PATENT DOCUMENTS

| | | |
|---|---|---|
| 480778 | 1/1952 | Canada . |
| 1015210 | 8/1952 | France ................. 16/267 |
| 3989 | 10/1876 | United Kingdom ........ 29/11 |
| 9218392 | 10/1992 | WIPO . |

OTHER PUBLICATIONS

Underhill & Castland (FIGS. 1-8) No. 4230, Nov. 1876.
Boyce (FIGS. 1-8) No. 3831, Sep. 1878.

*Primary Examiner*—Peter Dungba Vo
*Attorney, Agent, or Firm*—Pearne, Gordon, McCoy & Granger

[57] ABSTRACT

The invention relates to the method of making a hinge joining rigid plastic pieces at least one fourth inch thick and includes machining a series of hinge knuckles along straight edges of first and second pieces of rigid plastic, machining keyhole shaped passages perpendicular to and across the width of hinge knuckles of the pieces, the keyhole shaped passages each having a tubular central portion and an outwardly extending slot of narrower width on one side of each knuckle, each hinge knuckle having a width less than the space between adjacent knuckles so that the knuckles of each of the two pieces may be assembled by interleaving the hinge knuckles, and inserting a hinge pin through the aligned tubular central portion to hinge together the first and second pieces. The invention also relates to the hinge structure as so manufactured.

8 Claims, 3 Drawing Sheets

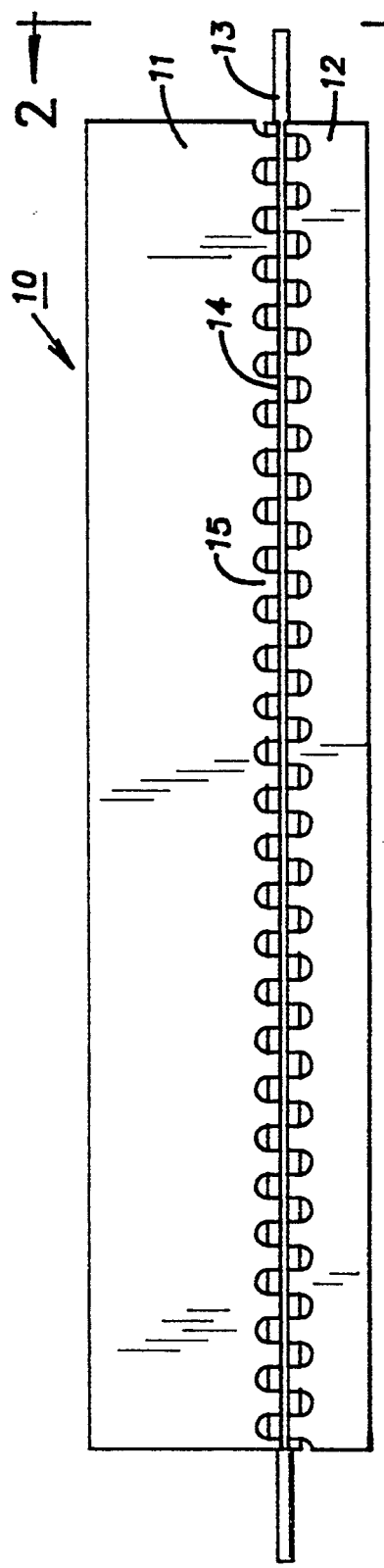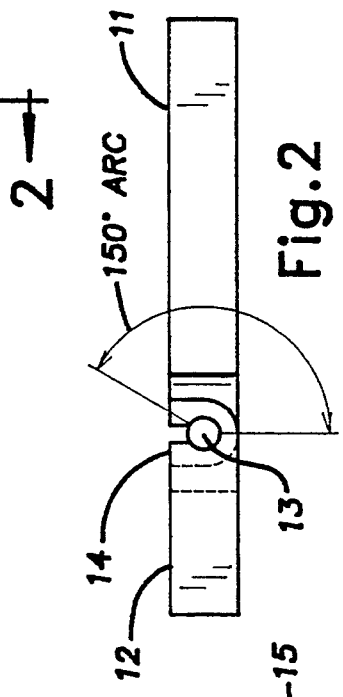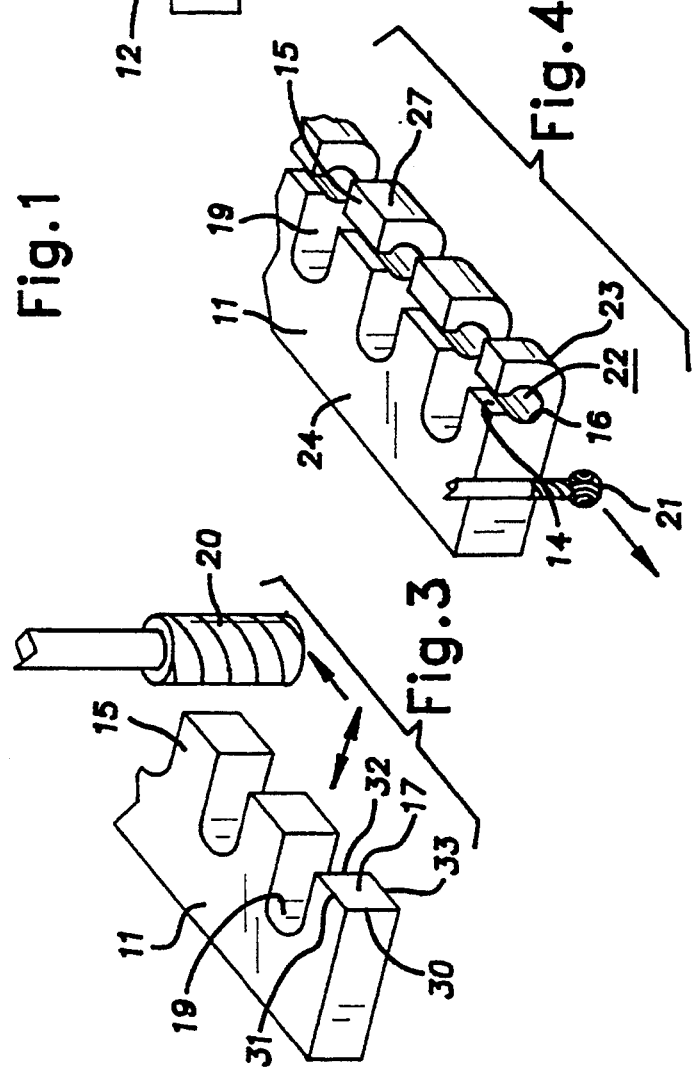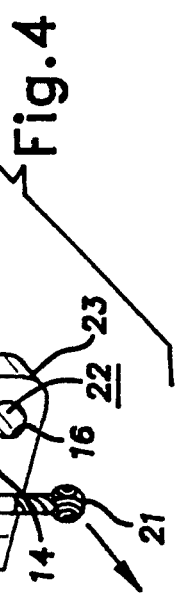

METHOD OF MAKING A CONTINUOUS PLASTIC HINGE STRUCTURE

BACKGROUND OF THE INVENTION

Rigidized plastic enclosures have previously been disclosed in the PCT publication No. WO92/18392. The present invention relates to continuous hinge structures cut from a rigid plastic sheet at least about one-fourth inch thick and to a method of making them.

Many different continuous hinge structures and methods of manufacture have previously been set forth. Most hinges are made from thin metal sheet or are molded from metal or plastic. U.S. Pat. No. 4,010,524, for example, shows making the hinge from metal strip in which the metal strip is fed into a punching machine and notches are cut in the metal strip and then bent over to form hinge knuckles. U.S. Pat. No. 4,358,871 discloses making a hinge from two plastic pieces, each being capable of being molded in a two part mold and therefore each barrel encircles only 180° of the hinge pin. U.S. Pat. No. 4,615,464 shows a molded hinge wherein each half of the hinge is molded from plastic and then the hinge barrel must be drilled from the end. U.S. Pat. No. 4,930,753 also discloses a molded plastic hinge made in a two part mold wherein each hinge knuckle embraces only 180° of the hinge pin. U.S. Pat. No. 5,070,577 discloses a collapsible container wherein the base and sidewalls are hinged together with two hinge pieces in which each hinge piece has both a hinge pin and a cylindrical surface portion. U.S. Pat. No. 4,603,452 discloses a hinge which is readily separable by use of a hinge pin which has flattened portions and hinge barrels which are slotted. Canadian Patent No. 480,778 discloses an extruded aluminum hinge wherein each hinge leaf and the enlarged knuckle is extruded from high strength aluminum and the knuckles are formed by machining with a slot extending from the very distal end of the knuckle. This has the disadvantage that when the hinge leafs are interleaved and the hinge pin installed, the two hinge leaves can be pulled apart rather readily because there are only two about 45° arcs interengaging between the hinge pin and the hinge knuckle.

SUMMARY OF THE INVENTION

The present invention discloses a continuous plastic hinge and the method off making it which is an improvement on the hinges of the prior art. PCT application publication No. WO92/18392 discloses a prior art method of making a collapsible electric enclosure box from a flat, rigid, plastic blank and this is an improvement over that publication in showing how to provide a hinged cover for that electrical enclosure box. The invention includes a method of making a continuous hinge joining rigid sheets together comprising the steps of machining a series of hinge knuckles along a straight edge of a first length or piece of rigid material and along a straight edge of a second piece of rigid material, machining keyhole shaped passages perpendicular to and across the width of the hinge knuckles of each of the first and second plastic pieces, said keyhole shaped passages each being defined by a tubular central portion and an outwardly extending slot of narrower width extending to an outer surface of the respective knuckle, each hinge knuckle having a width less than the space between adjacent knuckles, assembling the knuckles of the two pieces by interleaving the hinge knuckles of the two pieces such that the tubular central portions of the keyhole passages are aligned perpendicularly of the knuckles, and inserting a hinge pin through the aligned tubular central portions to hinge together the first and second pieces.

The invention further may be set forth in the structure of a hinge, namely, a long continuous or piano type hinge comprising in combination first and second rigid plastic pieces, each having a first edge along a straight line, a series of hinge knuckles formed in each of said first edges, a series of perpendicular keyhole shaped passages across the width of side portions of said knuckles, each keyhole shaped passage being defined by a tubular central portion and an outwardly extending narrower slot which extends to only one side of each knuckle as distinguished from the end at said first edge, the knuckles of the two plastic pieces being interleaved such that the tubular central portions are aligned parallel to the respective first edges of the plastic pieces, and a hinge pin slidably inserted through the tubular central portions to hinge together the first and second plastic pieces.

Accordingly, an object of the invention is to provide a hinge which may be readily machined from rigid lengths or sheets of material such as plastic.

Another object of the invention is to provide a long piano type hinge which may be machined by a machining center such as a computer numeric controlled machine tool.

Another object of the invention is to provide a method of making a hinge from plastic pieces which is stronger than the prior art construction.

Another object of the invention is to provide a hinge which may be made from two lengths or pieces wherein one of the pieces is a sheet which is unitary with the cover of a container.

Another object of the invention is to provide variable numbers of knuckles with variable widths, determined by the computer numeric control, and suitable for the specific application requirements.

Other objects and a fuller understanding of the invention may be had by referring to the following description and claims, taken in conjunction with the accompanying drawings.

BRIEF DESCRIPTION OF THE DRAWINGS

FIG. 1 is a plan view of an assembled hinge made in accordance with the invention;

FIG. 2 is an enlarged end view, in cross-section, of the hinge of FIG. 1;

FIG. 3 is an enlarged isometric view of a method of machining the hinge knuckles;

FIG. 4 is an enlarged isometric view of the method of machining the tubular central portions and narrower outwardly extending slots;

DESCRIPTION OF THE PREFERRED EMBODIMENT

Figure 5:
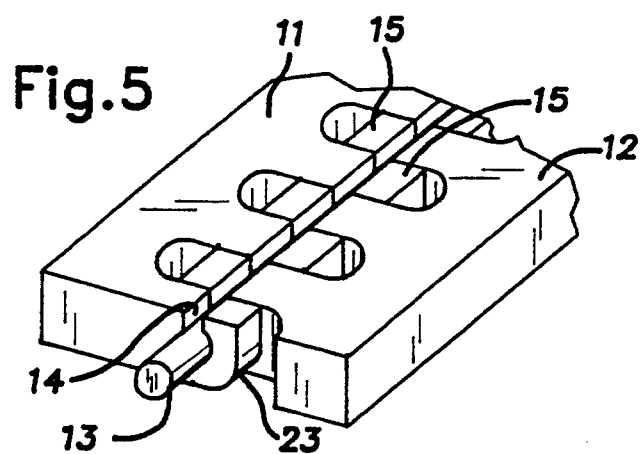
FIG. 5 is an enlarged isometric view of the hinge of FIG. 1.

The FIG. 1 shows a hinge 10 made from two pieces or leaves 11 and 12. The hinge pieces 11 and 12 may be of almost any rigid material which can be cut or shaped, but in this preferred embodiment, they are of rigid plastic sheet material and should have a thickness in the range of at least about one quarter inch. The hinge has the two pieces 11 and 12 and, in addition, has a hinge pin 13. In practice, this hinge pin 13 would not extend beyond the ends of the hinge but is shown as extending beyond the ends in FIG. 1 in order to show that it is of larger diameter than a narrow slot 14 extending to a top or bottom surface of the leaf 11, such as top surface 24 on each knuckle 15. There are hinge knuckles 15 on each of the plastic pieces 11 and 12 and they are interfitted or interleaved into round ended slots or sockets 19 as shown in FIGS. 1 and 5. The narrow slots 14 lead inwardly in each knuckle to a tubular central portion 16 to define in cross-section a keyhole shaped passage 22 (FIG. 4). These tubular central portions 16 are all aligned as shown in FIG. 5 in order to receive the hinge pin 13. This may be a metal or a plastic hinge pin. The narrow slots 14 are likewise all aligned as shown in FIG. 5 and are narrower than the diameter of the tubular central portions 16 in order to completely retain the hinge pin 13.

As shown in FIG. 3, the knuckles 15 are machined out of straight edge 18 of piece 11 with a cylindrical shaped milling cutter 20. This is preferably done on a computer numeric controlled machine. The milling cutter 20 may be moved parallel to the edge 18 and then perpendicularly and inwardly (FIG. 3., to the left) to carve out the round-ended slots or sockets 19 and form the knuckles 15. Alternatively, the width of slot 19 can be varied by varying the diameter of milling cutter 20 or by moving milling cutter 20 parallel or arcuately to edge 18 after milling cutter 20 has cut near to the back (shown by lead line 19 in FIG. 3) of slot 19. The width of knuckles 15 would then be varied to correspond with the width of slots 19.

The keyhole shaped passage 22 is formed with a ball milling cutter 21 as shown in FIG. 4. This provides the narrow slot 14 and the tubular central portion 16 into which the hinge pin 13 may be inserted. The knuckles 15 are placed about halfway into the slots 19. The fit between the knuckles 15 and the slots 19 may be a relatively close one. By making the fit quite close, in effect, by slightly enlarging the size of the knuckles, one can provide what is called a dampened swing for the hinge. This means that the hinge does not swing freely back and forth. It has a stiff or dampened swing which, in some situations, is an advantage. The piece 11 may be provided with a rounded edge 23, as shown in FIG. 4, for appearance and safety sake, as well as to minimize interference with the back of slot 19. Slots 19 may be deeper, causing knuckles 15 to be longer, giving the hinge a longer swing. After the keyhole shaped passages have been machined into the knuckles on each piece and the knuckles inserted into or interleaved with the slots 19, then the hinge pin 13 may be inserted. This may be either a metal or a plastic hinge pin in order to complete the hinge as shown in FIGS. 1 and 5.

Figure 7:
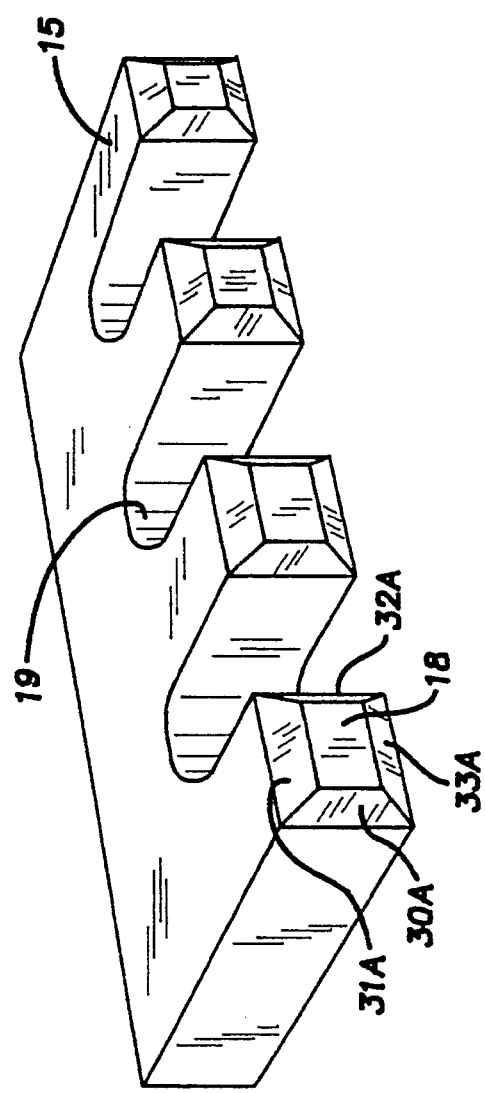
FIG. 7 is an enlarged isometric view of an alternative shape for the machined hinge knuckle.

With reference to FIGS. 3 and 7, the edges 30, 31, 32 and 33 of knuckle 15 near edge 18 can alternatively be rounded or beveled to provide rounded or beveled edges 30A, 31A, 32A and 33A. This is done to eliminate interference with the curvature near the back of slot 19 and to reduce the chance of knuckle 15 catching at the back of slot 19 and to eliminate a sharp edge for safety sake.

The machining may be accomplished by many different types of machine tools. A preferred type is a CNC (Computer Numeric Control) machine tool such as in a machining center. Also, a CAD/CAM (Computer Aided Design/Computer Aided Manufacturing) software program can be used to incorporate the hinge design into the enclosure and the design can be downloaded to the CNC.

The keyhole shaped passages, as shown in FIGS. 1 and 4, are formed with the narrow slot 14 to the top surface 24 of or toward the base of the knuckle 15 perpendicular to the plane of the piece or plastic sheet 11 rather than being formed in the distal end 27 which would be toward the first edge 17 parallel to the plane of the piece 11. This has the distinct advantage as shown in FIG. 2 in that there is a continuous arc of at least about 150° of contact between the hinge pin 13 and the knuckle 15. This makes for a considerably stronger structure than if the narrow slot 14 were positioned at the distal end 27 of the knuckle. This would be like the prior art where there are only two small arcs of about 45° each in bearing contact between the hinge pin and the knuckle to resist compression or tension forces when the two hinge leaves are at 180° to each other as shown in FIGS. 1 and 5.

If desired, the knuckles 15 may be lengthened so that there is interference with the slots 19 when the hinge pivots or swings. In this way, the swing can be limited to ninety degrees or whatever may be desired. The depth of the tubular central portion 16 in leaf 11 can be deeper or shallower than the depth of the tubular central portion 16 in leaf 12 to create an eccentric swing when the hinge is operated. The depth of the tubular central portion 16 can be varied by plunging the ball milling cutter 21 deeper or shallower.

Figure 6:
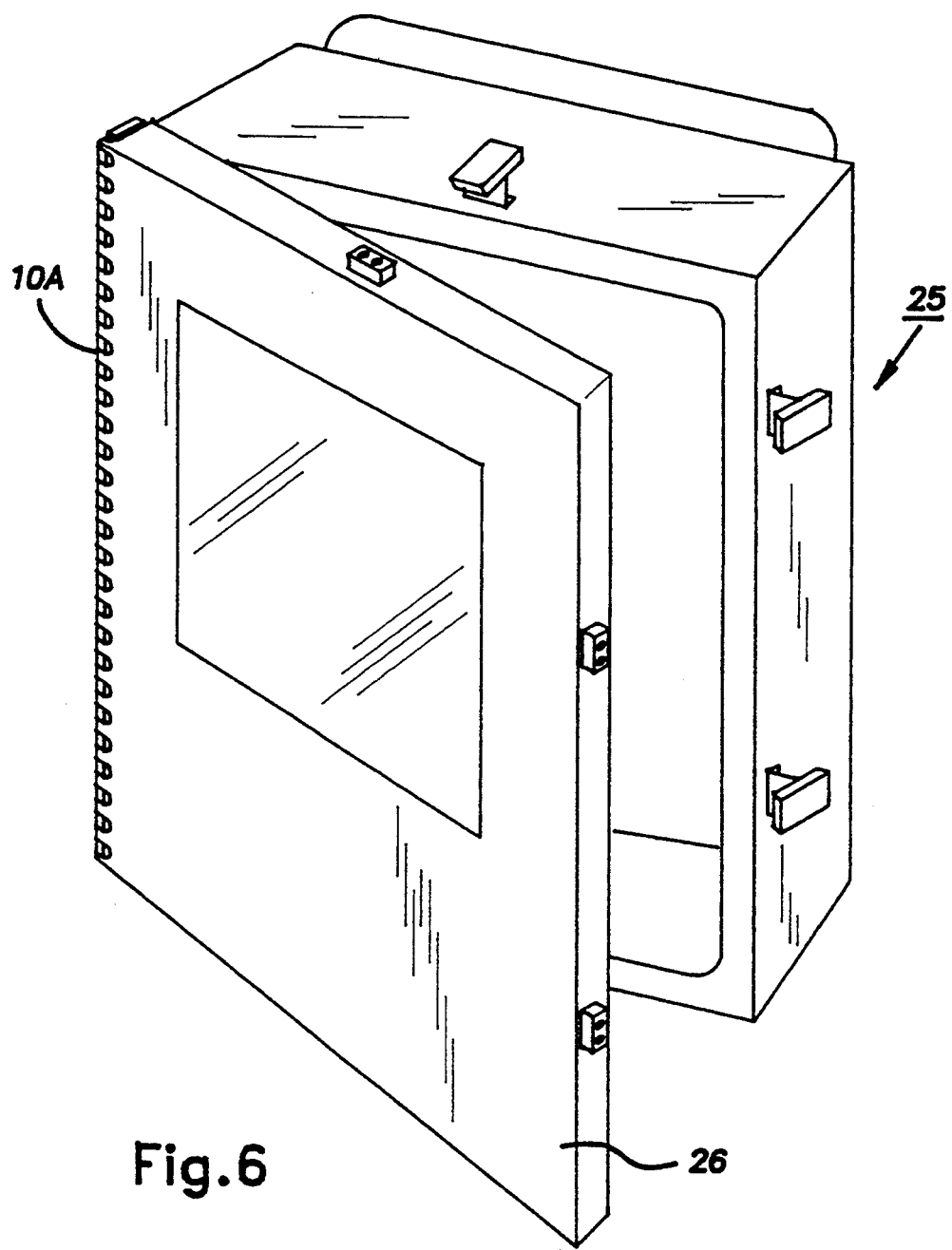
FIG. 6 is an isometric view of a container such as an electrical box with a hinged cover.

The two leaves 11 and 12 of the hinge may be fastened to the door or cover which is to be hinged to an enclosure or a container. This fastening may be by heat sealing or heat welding if the container is a plastic surface. Another important alternative and advantage is that shown in FIG. 6 wherein a hinged cover is provided for an electrical equipment enclosure of the type shown in the PCT published application No. WO92/18392. While the two leaves 11 and 12 of the hinge may be heat sealed to the equipment box 25 and to the door or cover 26. A better looking and sturdier product may be achieved by making one leaf of the hinge unitary with the cover sheet 26 itself. This is as shown in FIG. 6 wherein the leaf 12A of the hinge 10A is unitary with the cover or door 26.

The leaf 11A is welded to the side of the enclosure 25. In this preferred embodiment, the thickness of the leaf 12A is the same as that of the cover 26 because it is integral with and cut out of the cover. This makes for a neater looking enclosure and saves the step of welding the leaf 12A to the cover. Likewise, if desired, the hinge knuckles may be cut out of both the cover and the side of the enclosure and interfitted without any welding or other attaching step. In other words, the hinge is formed or cut out at the straight edges of the parts which are to be hinged together, there is no separate continuous hinge structure.

The CNC machine is preferably programmed to select the appropriate knuckle 15 and slot 19 widths so that a whole number of knuckles and slots are provided without any fractions, thus providing flush ends for the hinge. Typically, the more knuckles and slots per inch length of hinge, the more evenly spread the stresses and the stronger the hinge.

In the preferred embodiment, the hinge pin is cylindrical and the tubular central portions are portions of internal cylindrical surfaces. The hinge pin is one which fits closely within the tubular central portions 16 and is larger in diameter than the width of the narrow slots 14.

For enclosures, such as shown in FIG. 6, and for other applications in the electrical and electronic industry, the preferred plastic is rigid polyvinyl chloride.

If desired, articulated doors or hinges may be made in accordance with the present invention wherein a half or other portion of a door or cover is provided with a second hinge so that the door can be folded back upon itself and then the door opened.

Hinges made in accordance with the present invention are very solid and strong. The cover 26 can support considerable forces or weights at its outer edge as it swings open and shut.

The present disclosure includes that contained in the appended claims, as well as that of the foregoing description. Although this invention has been described in its preferred form with a certain degree of particularity, it is understood that the present disclosure of the preferred form has been made only by way of example, and that numerous changes in the details of the structure and the combination and arrangement of structure elements may be resorted to without departing from the spirit and scope of the invention as hereinafter claimed.

What is claimed is:

1. A method of making a hinge joining rigid pieces each with top and bottom surfaces comprising, the steps of:

machining a series of parallel hinge knuckles along a first straight edge of a first piece of rigid plastic material at least one fourth inch thick and along a first straight edge of a second piece of rigid plastic material at least one fourth inch thick at the straight edges, each knuckle having a width from side-to-side and a distal end;

machining keyhole shaped passages perpendicular to the length of the hinge knuckles and across the width of the hinge knuckles of each of the first and second plastic pieces;

said keyhole shaped passages each being defined by a tubular central portion and an outwardly extending slot of narrower width extending to one of a top or bottom surface of the respective knuckle;

each hinge knuckle having a width slightly less than the space between adjacent knuckles;

assembling the knuckles of the two pieces by interleaving the hinge knuckles of the two pieces so that the tubular central portions are aligned perpendicularly of the knuckles; and inserting a hinge pin through the aligned tubular central portions to hinge together the first and second pieces.

2. The method as set forth in claim 1 wherein, each outwardly extending slot extends to one side of the respective knuckle as distinguished from the distal end thereof at said first edge of the respective pieces.

3. The method as set forth in claim 1 wherein each of the first and second pieces of rigid plastic material is one fourth inch thick.

4. The method as set forth in claim 1 wherein the hinge pin has a diameter slightly smaller than the tubular central portions and larger than the width of the outwardly extending slots.

5. The method as set forth in claim 1 wherein the hinge forms a long piano type hinge.

6. The method as set forth in claim 1 wherein one of the hinge pieces is unitary with a cover of an electrical enclosure.

7. The method as set forth in claim 1 wherein the hinge pin is cylindrical and the tubular central portions are portions of internal cylindrical surfaces.

8. The method as set forth in claim 7 wherein when the first and second pieces are hinged together and when the pieces are at 180° to each other there is a continuous circular arc of at least 150° on each knuckle bearing against the hinge pin to resist tension and compression forces between the pieces.

* * * * *

Disclaimer 5,377,396—Thomas F. Moran, Jr., Chargin Falls, Ohio. METHOD OF MAKING A CONTINUOUS PLASTIC HINGE STRUCTURE. Patent dated January 3, 1995. Disclaimer filed October 10, 2000, by the assignee, Midwest Plastic Fabricators, Inc.

The term of this patent subsequent to April 11, 2011 has been disclaimed.
(*Official Gazette*, January 16, 2001)